US006496864B1

(12) United States Patent
McCartney

(10) Patent No.: US 6,496,864 B1
(45) Date of Patent: *Dec. 17, 2002

(54) SYSTEM AND METHOD FOR FREEING SHARED RESOURCES IN A COMPUTER SYSTEM

(75) Inventor: Colin McCartney, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/222,062

(22) Filed: Dec. 29, 1998

Related U.S. Application Data

(62) Division of application No. 08/741,474, filed on Oct. 30, 1996.

(51) Int. Cl.[7] .......................... G06F 12/00; G06F 13/14
(52) U.S. Cl. ...................... 709/226; 709/104; 709/205; 709/206; 709/223; 709/238; 709/239
(58) Field of Search ................................. 709/100, 200, 709/205, 206, 223, 238, 239, 226, 104, 229

(56) References Cited

U.S. PATENT DOCUMENTS 5,761,659 A * 6/1998 Bertoni ........................ 707/8
5,812,533 A * 9/1998 Cox et al. ................... 370/259
5,982,891 A * 11/1999 Ginter et al. ................. 705/54
6,275,857 B1 * 8/2001 McCartney ................. 709/226
6,279,124 B1 * 8/2001 Brouwer et al. .............. 714/48

* cited by examiner

*Primary Examiner*—Majid A. Banankhah
(74) *Attorney, Agent, or Firm*—Workman, Nydegger & Seeley

(57) ABSTRACT

The present invention relates to systems and methods for freeing shared resources that remain allocated to a particular resource allocating process after the resource allocating process has terminated. The invention is useful in a computer system where shared hardware is accessed via a shared hardware driver layer. The shared hardware driver layer interfaces with either a shared API layer or a nonshared API layer. Processes wishing to access the shared hardware access the hardware through either the shared or nonshared API layer. To release resources and destroy objects in either the shared API layer or the shared hardware driver layer, the present invention uses a helper process that cleans up after termination of the resource allocation process. The helper process first calls a cleanup function in the shared API layer to release resources and destroy objects in the shared API layer and associated hardware driver. The helper process then loads a copy of the nonshared API layer and makes a call to a similar cleanup function to release any remaining resources and destroy any remaining objects. In the alternative, the helper process loads a copy of the nonshared API layer and calls to the similar cleanup function are made by the cleanup function in the shared API layer.

20 Claims, 6 Drawing Sheets

SYSTEM AND METHOD FOR FREEING SHARED RESOURCES IN A COMPUTER SYSTEM

RELATED APPLICATIONS

This application is a divisional of U.S. patent application Ser. No. 08/741,474, filed on Oct. 30, 1996, entitled "System and Method for Freeing Shared Resources in a Computer System," which is incorporated herein by reference.

BACKGROUND OF THE INVENTION

1. The Field of the Invention

This invention relates to systems and methods for freeing shared resources in a computer system. More specifically, the present invention relates to systems and methods for freeing shared resources that have been allocated to a process that has terminated without freeing resources allocated to it.

2. The Prior State of the Art

When personal computers were first introduced, the operating systems were fairly rudimentary and only provided for a single task or process to run on the computer at any given time. This process had complete access to all system resources when it was running and could generally directly access any of the hardware devices on the computer. For example, many processes wrote directly to the display hardware to display information to a user. Because the process was the only process trying to access the display device, writing directly to the display device produced few problems and generally resulted in good performance even though these early personal computers had relatively little computing power.

One unfortunate drawback of directly accessing the computer hardware is that the program expected to see a particular type of hardware. This typically did not create any problems as long as most computers had identical hardware. For example, early computers offered very few choices with regards to the type of display device. As technology increased, however, the types of display devices available have proliferated and users today seem to have an almost limitless choice of display devices. If a process is going to write directly to the display device, the process must be able to operate with many, if not all, of the various display devices that are available. This can create enormous problems for computer programs that are created for wide distribution. Display devices are not the only hardware devices where these types of problems can arise. Other computer hardware may also present similar problems if a program attempts to directly access the hardware.

In order to eliminate the direct dependence on hardware, methods have been developed to allow a process to access a piece of hardware in a "device independent" manner. Essentially, this means that a process can access a particular type of hardware device in a manner that is essentially consistent from one hardware device to another. For example, if a program is to access a display device it would be desirable to allow the program to access any type of display device in substantially the same manner without having to worry about the particular hardware details of each individual display device. In order to provide a consistent interface between a process and a particular type of hardware device, there may be several abstraction layers between the actual hardware and the process. FIG. 1 contains an illustration of one method for allowing a process device independent access to hardware.

In FIG. 1, the actual hardware is illustrated by hardware 10. This hardware is often referred to as a "hardware layer." Hardware 10 represents the actual system hardware itself, such as a display device with its accompanying adapter card or a disk drive controller. On top of the hardware layer is often a "driver layer." In FIG. 1, the driver layer is illustrated by hardware driver 12. The driver layer is typically responsible for interfacing directly with the hardware and provides a set of interface functions that allow low level access to hardware 10. The driver layer hides device details by taking device independent requests and converting them to hardware specific requests. In other words, the driver layer provides a standardized or consistent set of functions that allows access to a particular type of hardware device in a substantially consistent manner independent of the actual hardware device used. Interfacing with hardware driver 12 is an application program interface layer or "API layer." The API layer enhances the ease of use of the driver layer. The API layer can provide parameter validation and error checking to filter bad requests from processes. The API layer may also implement higher level services on top of the driver layer in order to add additional functionality. In FIG. 1, the API layer is illustrated by application program interface 14. As illustrated in FIG. 1, process 16 uses application program interface 14 to access hardware 10 through hardware driver 12. Together, hardware driver 12 and application program interface 14 allow process 16 to access hardware 10 in a device independent manner so that the hardware details are hidden and the interface remains substantially constant independent of the actual hardware used.

Accessing hardware in a device independent manner overcomes the drawback of requiring a process to be written specifically for a particular type of hardware and allows a single process to function with a wide variety of hardware devices. Another problem that has arisen due to advances in technology is the need to share single hardware devices among a plurality of processes. In the early days of personal computers, the hardware and operating systems were designed to allow a single process to run on the computer at any given moment. However, today's operating systems often allow several processes to appear to run simultaneously on a single computer. This capability, known as multitasking, requires multiple processes on a single computer to share common hardware. For example, for computer systems that have only a single display device, if two processes are running simultaneously on the computer, then each may need access to the display device. This creates a situation where the display device must be shared among multiple processes. Similar requirements exist for other types of computer hardware such as input devices like keyboards, a mouse or other pointing device, or another type of input device, mass storage devices such as disk drives, and other hardware that may need to be shared among multiple processes.

To accommodate such shared access to various hardware devices while maintaining device independent access to hardware, the model presented in FIG. 1 can be extended. For example, hardware layer 10 can become a shared hardware device. Hardware driver 12 may become a shared hardware driver, and application program interface 14 may become a shared application program interface. Referring now to FIG. 2, these three layers are illustrated as shared hardware layer 16, shared hardware driver layer 18, and shared API layer 20. As indicated in FIG. 2, these layers are shared among a plurality of processes. For example, shared hardware layer 16 may represent a common display device that is shared by multiple processes. Shared hardware layer 16 is accessed through shared hardware driver layer 18 which, like its counterpart in FIG. 1, generally provides a set of functions that allows low level access to shared hardware layer 16. Finally, shared API layer 20 provides a device independent interface for the multiple processes that share the hardware.

In FIG. 2, the hardware is shared by two processes, process A, indicated generally as 22 and process B, indicated generally as 24. Since shared API layer 20, shared hardware driver layer 18, and shared hardware layer 16 must be shared between a plurality of processes, such as process 22 and process 24, it may be desirable to map shared API layer 20, shared hardware driver layer 18, and shared hardware layer 16 into the address space of both process 22 and process 24. This is indicated in FIG. 2 by showing shared API layer 20, shared hardware driver layer 18, and shared hardware layer 16 as part of the shared address space. Anything in the shared address space is literally shared between both processes. For example, shared API layer 20 can be seen and accessed both by process 22 and process 24. This is because shared API layer 20, as well as the other shared layers, are mapped into the address space of the processes and become part of the processes. Because shared API layer 20 is shared between a plurality of processes, the shared API layer must be able to resolve conflicts and contentions between the plurality of processes. In general, shared API libraries are quite complex and take a lot of time and care to develop.

In addition to the shared address space, each individual process typically has a local or nonshared address space. The local address space contains the local executable code and data of the process. In addition, local API layers, such as local API layer 26, may also be loaded into the local address space of a process. In summary, a process may consist of local executable code and data, local API layers, shared API layers, shared hardware drivers, and shared hardware.

When a hardware device is shared among a plurality of processes, it may be necessary to allocate certain resources for use specifically by a particular process. For example, when a display device is shared among a plurality of processes, each process may require allocation of some video memory of the display device. This allows the process to write data into the video memory in order to display information on the display device. Conceptually, the allocated resources can be viewed as being allocated in the shared API layer, since that is the layer that a process will use to access the hardware in a device independent manner. In FIG. 2, such shared resources are illustrated by shared resource 28, shared resource 30, and shared resource 32. In FIG. 2, shared resource 28 and shared resource 30 are allocated for use by process A as indicated by the "A" label. Shared resource 32 is allocated for use by process B as indicated by the "B" label. In addition to the resources allocated in the shared API layer, certain shared hardware driver layers may also keep information internally that relates specifically to a particular process. For example, in FIG. 2, shared hardware driver 18 has resource 34 that relates specifically to process A. Resources in the shared hardware driver layer 18 may be linked to or related to resources allocated in shared API layer 20 as indicated by line 36. Resource 34 can be any type of resource that is needed to be kept specifically for a particular process. For example, resource 34 can be internal representation of data that is stored for process A in resource 28 of shared API layer 20.

In addition to resources allocated in a shared API layer, if a process has a local API layer loaded into its local address space, such as local API layer 26, then resources may also be allocated in the local API layer. This is illustrated in FIG. 2 by resource 38 of local API layer 26. Such resources can be any type of resource that is allocated by a particular process through the local API layer.

One problem with allocating resources in shared layers is that such resources tend to be scarce. For example, display devices typically only have a limited amount of video memory that can be allocated for use. The limited amount of video memory must be shared among all processes. Thus, if one process allocates a large amount of video memory and then does not return the video memory to a pool where it can be allocated for use by another process, a situation can arise where there is insufficient video memory to allow a particular process to run successfully. Thus, it is very important that a process properly return allocated resources to a state where they can be reallocated for use by another process. In FIG. 2, if process A terminated without releasing the resources allocated in shared API layer 20 and shared hardware driver layer 18, these resources would remain allocated for use by the process, even though the process had terminated. In general, it is very difficult for a shared layer to determine when a resource is no longer needed by a particular process without input by the process. If the process has terminated abruptly, the process may leave resources allocated.

In order to avoid resource "leaks" when a process terminates abruptly and leaves resources in a shared layer allocated, one approach has employ a specialized second process specifically adapted to free shared resources. This second process can call a function in the shared layer that allows the shared layer to release allocated resources that are no longer needed and return them to a shared pool where they can be reallocated for use by another process. Such a situation is illustrated in FIG. 3. In FIG. 3, process 22 has terminated leaving resources in shared API layer 20 and shared hardware driver layer 18 allocated. Assuming process 24 is a specialized cleanup process, when process 24 discovers that process 22 has terminated, process 24 may call a cleanup function in shared API layer 20, such as cleanup 40. Cleanup function 40 can release resource 28 and resource 30 in shared API layer 20. Additionally, this process may also call a function in shared hardware driver 18 to release resource 34. If resource 28 is a software object, then resource 28 may be freed by calling a function or method of the object which destroys the object. The method that destroys the object may also call other methods in other objects or otherwise make system calls to free allocated resources. In this way, resources in the shared layers that remain allocated after a process terminates can be freed by another process that continues to run.

As indicated in FIG. 3, when process 22 terminates, all information in the local address space is destroyed and the resources allocated to the local address space of the process are returned to the system. This is part of the automatic cleanup of local resources that is performed by the operating system when a process terminates. Thus, when process 22 terminates, resource 38 of local API layer 26 is freed and returned to the shared pool of resources. The operating system cannot free shared resources because it has no knowledge of the binding between a process and a shared resource allocated in a shared API layer or shared driver layer. To release the shared resources another approach, such as employing process 24 to free shared resources must be used. Thus, the combination of process 24 calling cleanup function 40 to release resources allocated in the shared layers and the termination of process 22 itself, returned all allocated resources to a state where they could be reallocated for use by another process. The described method works quite well for resources that are contained in local API layers and resources that are contained in shared layers. However, if the resources in the shared layers are linked to the resources in the local layers, then the above method will not work. This is because when process 22 terminates and local resources are released, the links between resources allocated in the shared layers and the local layers would remain intact and be pointing to an undefined location after process 22 terminated. If any attempt was made by an allocated resource in a shared layer to follow the link to another resource that needed to be released, unpredictable results would occur. Furthermore, if resources allocated in a local API layer, such as resource 38 of local API layer 26, were linked to resources in shared hardware driver layer 18, then there would be no way to follow the link to properly release the resources in the shared hardware driver layer.

Thus, what is needed is a way to release shared resources that have links to resources that are not shared. In addition, it would be desirable to provide a system and method to release resources in a shared driver layer that were allocated by, and linked to, resources allocated in a local API layer.

SUMMARY AND OBJECTS OF THE INVENTION

The foregoing problems in the prior state of the art have been successfully overcome by the present invention, which is directed to a system and method for freeing shared system resources that remain allocated to a process after the process has terminated. The current system and method is directed particularly to resources that remain allocated in a shared API layer and a shared driver layer.

When a resource allocating process terminates without freeing resources allocated in shared layers, it is important to identify such resources and return them to a state where they can be reallocated for use by another process. For example, it is very common for a resource allocating process to create objects and allocate resources through a shared API layer. The objects created by the shared API layer and the resources allocated by the shared API layer may contain pointers or links to objects created through a local API layer. This is particularly true of the case where an object created through a local API layer uses an object created by a shared API layer as a target for data.

The normal process of destroying linked objects and releasing allocated resources can be summarized as follows. Consider two objects, object 1 created by the local API layer and object 2 created by the shared API layer. Now suppose that object 2 held a link or a pointer to object 1. Such a situation can occur when object 1 is created by an operation on object 2. In these situations, the allocation of object 1 may be hidden by the shared API layer. To destroy both objects and release the allocated resources, the normal procedure would be to call a destructor function or method of object 2 that was designed to destroy both object 1 and object 2 and release the resources allocated by the two objects. When the destructor function or method of object 2 was called, the function or method would follow the link to object 1 and call a destructor function or method of object 1 that would destroy object 1 and release the resources allocated by object 1. The destructor function of object 2 would then proceed to destroy object 2 and release the resources from object 2. The problem arises when object 1 is destroyed before object 2. Such a situation can occur when the local API layer and object 1 are destroyed by the operating system when a process exits without releasing shared object 2. If object 1 is destroyed before object 2, then when object 2 attempts to follow the link to object 1 in order to call the destructor for object 1, a system fault will occur.

The present invention solves this problem by starting a helper process. The helper process is notified when a resource allocating process terminates. The helper process then calls a cleanup function in a shared API layer. The cleanup function allows the shared API layer to search for objects or resources that remain allocated to the resource allocating process. If such resources or objects are found, the objects are destroyed and the resources released without attempting to reference any objects that may be linked to them. This prevents attempted access to nonexistent objects.

The present invention also releases resources that remain allocated in the shared hardware driver layer. As previously explained, a shared hardware driver layer may maintain internal resources allocated to a particular process. The shared hardware driver layer is accessed through an API layer. If the API layer is a local API layer, then when the process terminates, the local API layer is destroyed while leaving the resources in the shared driver layer. In order to release the resources in the shared driver layer, the present invention loads a copy of the local API layer into the helper process. The helper process then calls a cleanup function in the local API layer. This cleanup function then calls a function in the hardware driver layer that allows the hardware driver layer to search for resources that remain allocated to a process that has previously terminated.

In summary, the present invention frees resources in shared API layers that have links to nonexistent resources by having a helper process call a cleanup function that releases the resources without attempted reference through the link to a nonexistent object. This cleanup function also releases resources in shared driver layers that are referenced through the shares API layer. Resources that remain allocated in a shared hardware driver referenced through a nonshared API layer are released by loading a copy of the nonshared local API layer into the local address space of the helper process and then calling a cleanup function in the local API layer that frees the resources allocated in the shared driver layer.

Accordingly, it is a primary object of this invention to provide a system and method for releasing resources which prevent attempted access to objects that are no longer existent. Other objects of the present invention include: providing a system and method for releasing resources which release resources allocated to processes in shared hardware driver layers that remain allocated to processes that have previously terminated; and providing a system and method for releasing resources that is capable of releasing resources of interconnected objects where some of the objects have been destroyed and no longer exist.

Additional objects and advantages of the invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to a specific embodiment thereof which is illustrated in the appended drawings. Understanding that these drawings depict only a typical embodiment of the invention and are not, therefore, to be considered to be limiting of its scope, the invention will be described and explained with additional specificity and detail through the use of the accompanying drawings in which.

DETAILED DESCRIPTION OF THE PREFERRED EMBODIMENTS

The present invention contemplates both a system and method for releasing system resources. The presently preferred embodiment of the system comprises a general purpose computer. Such a general purpose computer can comprise any number of standard configurations of computers. For example, embodiments within the scope of the present invention can comprise a central processing unit (CPU), memory, mass storage devices such as hard disks, CD ROM, floppy disks, tape devices, and the like, display devices, printers, plotters, or other output devices, and a keyboard or other input device. The system and method of the present invention, however, can also be used with any special purpose computer or other hardware system and all should be included within its scope.

Embodiments within the scope of the present invention also include computer-readable media. Such computer readable media can be any available media which can be accessed by a general purpose or special purpose computer. By way of example, and not limitation, such computer readable media can comprise RAM, ROM, EEPROM, CD ROM or other optical disk storage, magnetic disk storage or other magnetic storage devices, or any other medium which can be used to store the desired program code means and which can be accessed by a general purpose or special purpose computer. Combinations of the above should also be included within the scope of computer readable media. Executable instructions comprises instructions and data which cause a general purpose computer or special purpose to perform a certain function or a group of functions.

Figure 1:
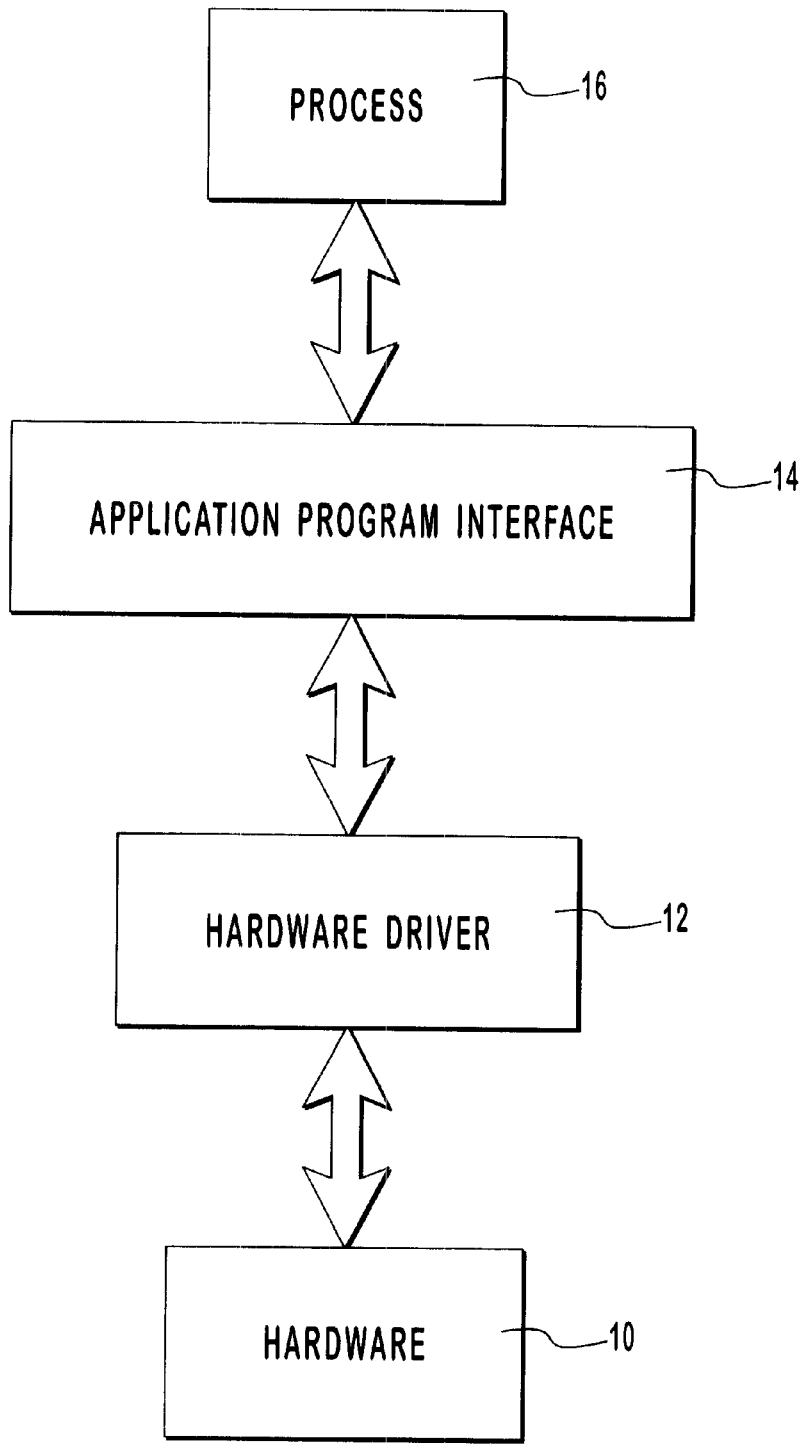
FIG. 1 is a diagram representing how a process accesses hardware in a device independent manner.
Figure 2:
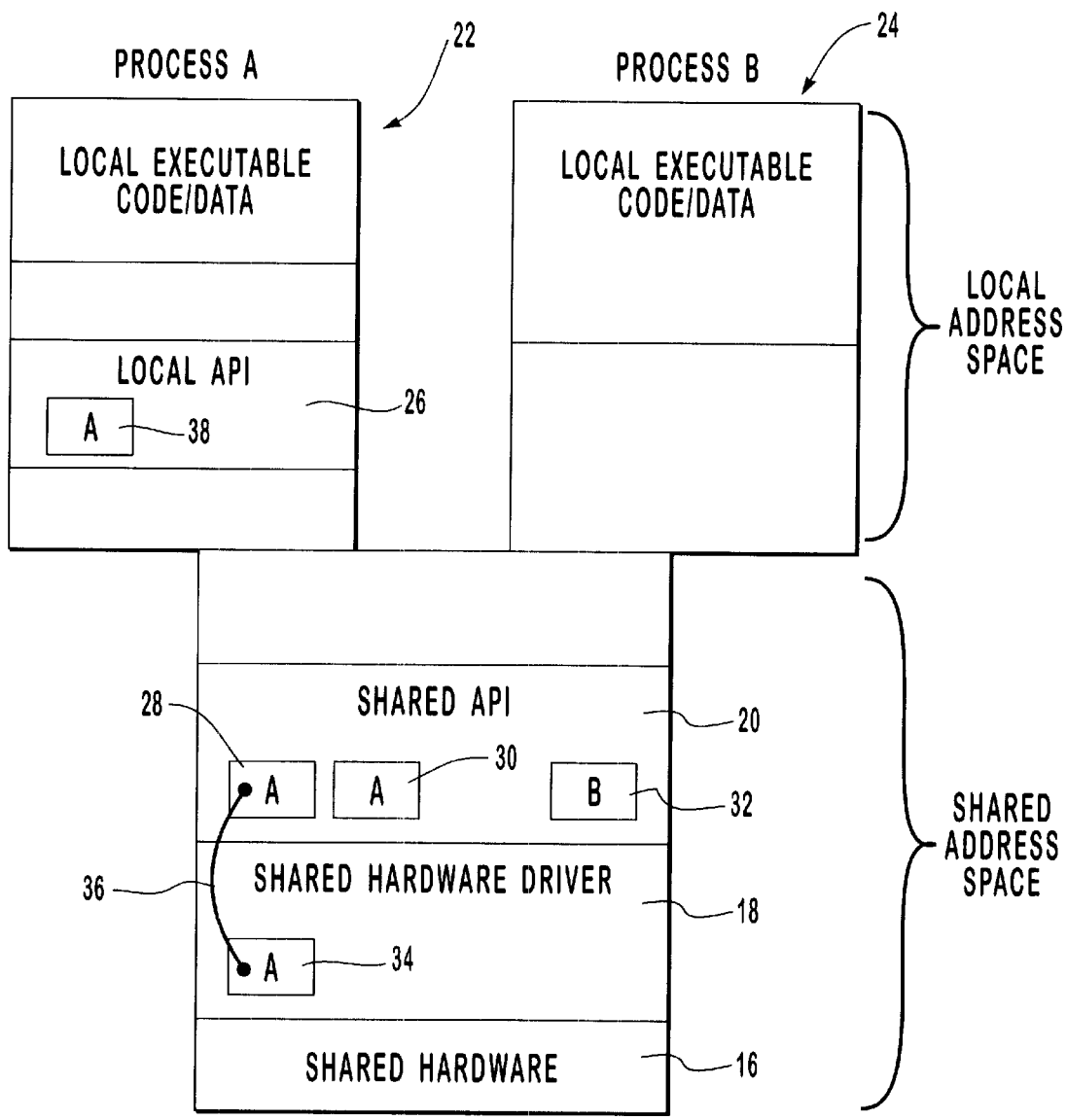
FIG. 2 is a diagram illustrating the local address space and shared address space of a plurality of processes.
Figure 3:
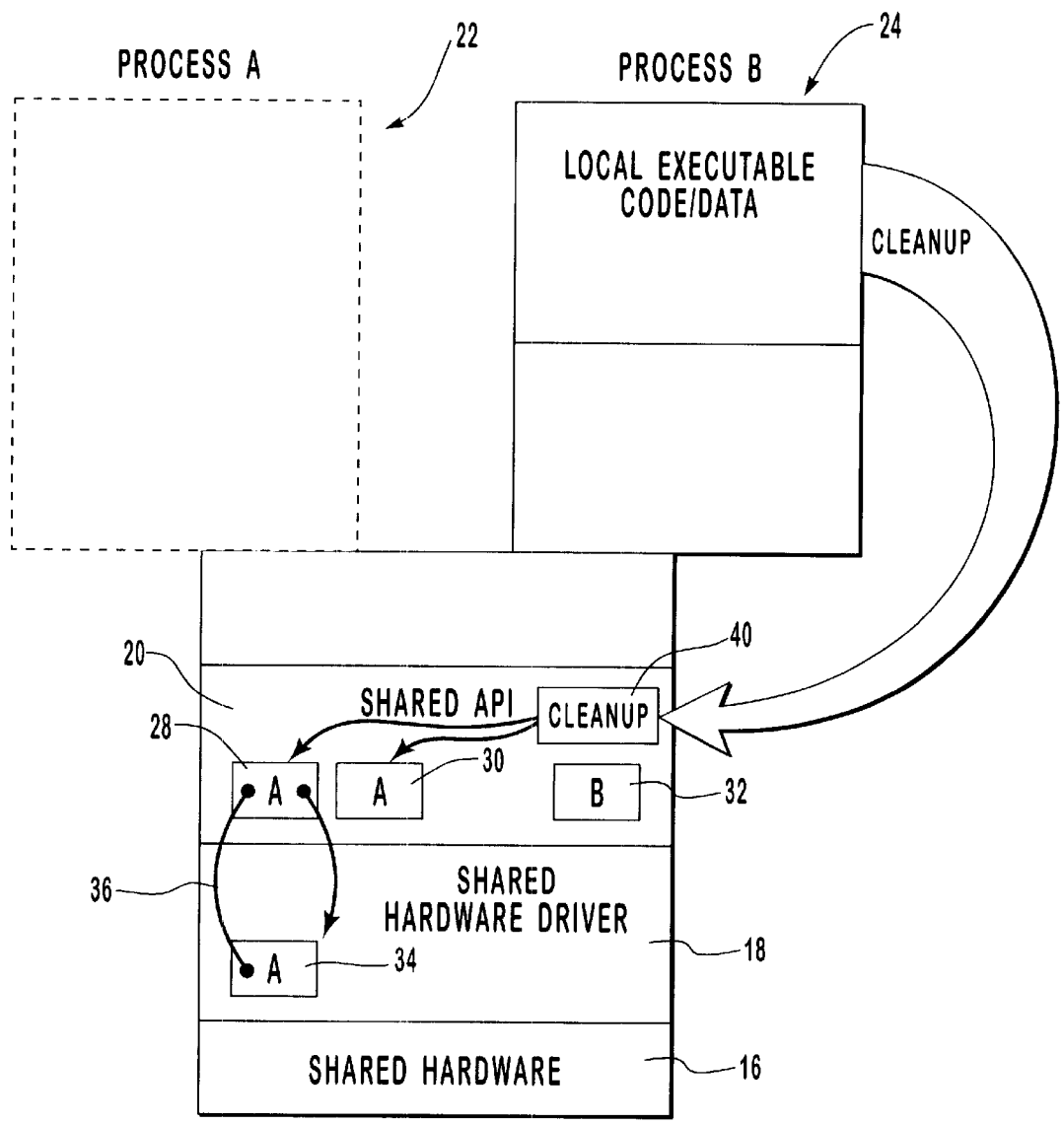
FIG. 3 is a diagram illustrating the use of one process to release shared resources.
Figure 4:
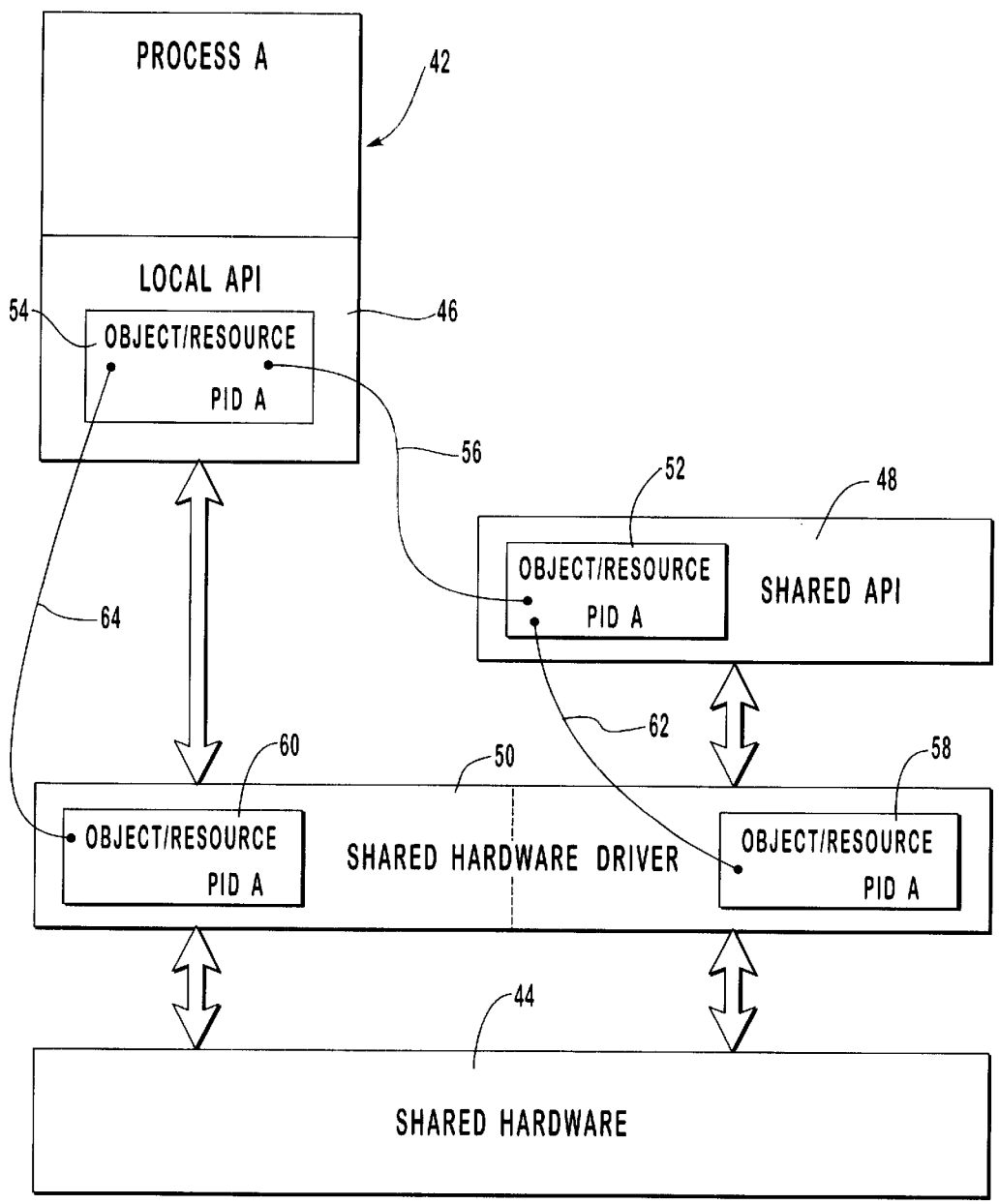
FIG. 4 is a diagram illustrating objects created by shared and local layers and resources allocated in shared layers.

Referring now to FIG. 4, a diagram of a process that accessed shared hardware and allocates both shared and nonshared resources or objects is presented. This diagram will help provide a more detailed context for the invention. In FIG. 4, a resource allocating process, such as Process A, shown generally as 42, accesses shared hardware 44 through local API 46 and/or shared API 48. Local API 46 is mapped into the local or nonshared address space of process 42 and shared API 48 is mapped into the shared address space of resource allocating process 42. Situated between shared hardware 44 and the API layers is shared hardware driver 50. In FIG. 4, shared hardware driver 50 is illustrated as having two parts. One part interfaces with local API 46 while another part interfaces with shared API 48.

In general, an API layer will interface with a hardware driver layer. The hardware driver layer will typically be shared, as illustrated in FIG. 4. Thus, a shared driver layer may interface with either a shared API layer or a nonshared API layer. Although in FIG. 4 hardware driver 50 is depicted as having two portions, one to interface with a shared API layer, another to interface with a nonshared or local API layer, this may be implemented in any number of ways. For example, it may be implemented using a single driver as illustrated in FIG. 4 or by having two separate drivers, one to handle interfacing with a local API layer and another to handle interfacing with a shared API layer. Such details are not important to the present invention. All that is needed is a way for each API to access hardware 44.

As resource allocating process 42 interfaces with shared hardware 44, objects or resources may be created and allocated in the API layers and/or the hardware driver layer. Thus, resources or objects may be created and allocated from local API 46, shared API 48, and/or shared hardware driver 50. In a sense, the API layers, such as local API layer 46 and shared API layer 48, can be thought of as a mechanism to interface with resources needed to access shared hardware 44. Thus, local API 46 and shared API 48 are examples of means for interfacing with resources. Local API layer 46 is not shared among processes since it resides in the local address space of resource allocating process 42. Local API layer 46 thus represents one example of means for interfacing with resources that is not shared among processes. On the other hand, shared API layer 48 is shared among all processes. Thus, shared API layer 48 represents an example of means for interfacing with resources that is shared among processes.

In order to present the invention in a more concrete context, an example of a graphics display device may be used. In this example, shared hardware 44 would represent the display device and associated hardware, such as a video card or other display adapter hardware. In this example, suppose that shared hardware 44 was to be used to display both two-dimensional and three-dimensional graphical objects. In such a situation, shared hardware driver 50 may be divided into two portions. One portion of the hardware driver may be designed to interface with an API layer in order to provide access to shared hardware 44 for the display of two-dimensional graphics. The other portion of shared hardware driver 50 may be adapted for interfacing with a second API layer that is designed to provide an interface with shared hardware 44 that allows easy display of three-dimensional graphical objects. In such an embodiment, one portion of shared hardware driver 50 may interface with acceleration hardware in shared hardware 44 for rapid display of two-dimensional graphic objects. Similarly, another portion of shared hardware driver 50 may interface with acceleration hardware in shared hardware 44 that is optimized to display three-dimensional graphical objects. In one embodiment, the two-dimensional graphic API layer is the Direct Draw API published by Microsoft and the three-dimensional graphical interface is the Direct 3D API also published by Microsoft. In this embodiment, the Direct Draw API is a shared API layer while the Direct 3D API is a nonshared API layer. The Direct Draw API is documented more fully in Chapter 2 of the Direct X Software Development Kit Manual, available from Microsoft, while the Direct 3D API is documented more fully in Chapter 5 of the Direct X Software Development Kit Manual, available from Microsoft, both incorporated herein by reference.

Returning now to FIG. 4, as previously indicated shared API 48 provides an interface to shared resources. The interface is shared among all processes on the system. Resource allocating process 42 may use shared API 48 to create objects that are used to render graphical objects to the display. In FIG. 4, objects or resources created and allocated by shared API layer 48 are indicated by object/resource block 52. In many API layers, an object oriented programming paradigm is used. Thus, access to system resources will be made through a software object. Object/resource block 52 is but an example of such a software object. Furthermore, the manner in which resources are allocated and accessed by resource allocating process 42 is largely irrelevant to the present invention. Resource allocating process 42 may also allocate resources or create objects through local API layer 46. This is illustrated in FIG. 4 by object/resource block 54.

Returning to the example of the two-dimensional and three-dimensional graphic object display, shared API layer 48 may be a Direct Draw API layer. Object/resource block 52 may then be a direct draw surface as described in co-pending U.S. patent application Ser. No. 08/641,014 filed on Apr. 25, 1996, in the name of Eric Engstrom and Craig Eisler, entitled Display Device Interface Including Support for Generalized Flipping of Surfaces, both incorporated herein by reference. Local API layer 46 may be the Direct 3D API as documented in Chapter 5 of the Microsoft Direct X Software Development Kit, previously incorporated by reference, and object/resource block 54 may be a type of Direct 3D object that provides access to shared hardware 44.

Situations may also arise where an object created by local API layer 46 is linked to an object created by shared API layer 48. Such a situation is presented when Direct 3D uses a direct draw surface as a target to render three-dimensional graphics. Since display of three-dimensional graphic objects is ultimately done on a two-dimensional display screen, a Direct Draw surface may be used as a rendering target for Direct 3D. In other words, since Direct Draw already implements all the functionality needed to take a two-dimensional graphic object and display it on the display device, and since a three-dimensional object must be rendered on a two-dimensional display device, Direct 3D can be made to render the three-dimensional objects in a two-dimensional graphic format. This two-dimensional graphic format can then be displayed on the display device by Direct Draw. Such a situation creates a tight coupling between the three-dimensional graphic interface and the two-dimensional graphic interface.

In a situation such as this, the Direct Draw object would need to maintain references to the Direct 3D objects. This creates a situation, such as that depicted in FIG. 4, where an object created by shared API layer 48 is linked to an object created by local API layer 46. In FIG. 4, link 56 links object/resource block 52 with object/resource block 54. Although a single link is shown in FIG. 4, object/resource block 52 may be have a plurality links to various objects either in the same or a different process.

While an API layer provides the primary interface for a process, the hardware driver layer provides the low level interface used by the API layer to access the hardware. In other words, an API layer, such as shared API layer 48 or local API layer 46, uses a hardware driver layer, such as shared hardware driver layer 50, to access shared hardware 44. It is not uncommon for the hardware layer, such as shared hardware driver 50, to maintain internal information or data that allows more efficient use of shared hardware 44. For example, shared hardware driver 50 may maintain an internal representation of data that is stored in an object or resource block in the API layer. This is illustrated in FIG. 4 by object/resource block 58 and object/resource block 60. In FIG. 4, object/resource block 58 is shown as associated with object/resource block 52 through line 62. Object/resource block 60 is shown as associated with object/resource block 54 through line 64. The information and/or data stored by shared hardware driver layer 50 is generally not thought of as an object but rather as a block of resources that are used by shared hardware driver 50. Thus, line 62 and line 64 may not represent an actual link between two objects but rather is designed to represent a more general association between the blocks. In fact, in some situations the API layer may not be aware that the driver layer is storing internal resources such as block 58 or block 60.

In the situation illustrated in FIG. 4, it is highly desirable that when resource allocating process 42 terminates, that all objects be destroyed and all resources returned to a general pool where they can be reallocated for used by another process. Failure to perform these functions results in resource "leaks" where once resources are allocated they cannot be reclaimed for use by other processes without a total shutdown and reinitialization of the entire system. In the normal termination procedure, resource allocating process 42 would destroy objects created through shared API layer 48 and local API layer 46. This may be accomplished, for example, by calling a function of object/resource block 52 which destroys object/resource block 52 and signals shared hardware driver layer 50 to release any resources it has allocated to resource allocating process 42. In addition, since object/resource block 52 holds a reference to object/resource block 54, object/resource block 52 can call a function of object/resource block 54 that releases the resources used by object/resource block 54, signals shared hardware driver layer 50 to release any resources allocated to resource allocating process 42, and destroys object/resource block 54. Such a procedure would guarantee that all resources allocated in the API layer were returned for use by other processes and all resources allocated by shared hardware driver layer 50 were returned for use by other processes.

Figure 5:
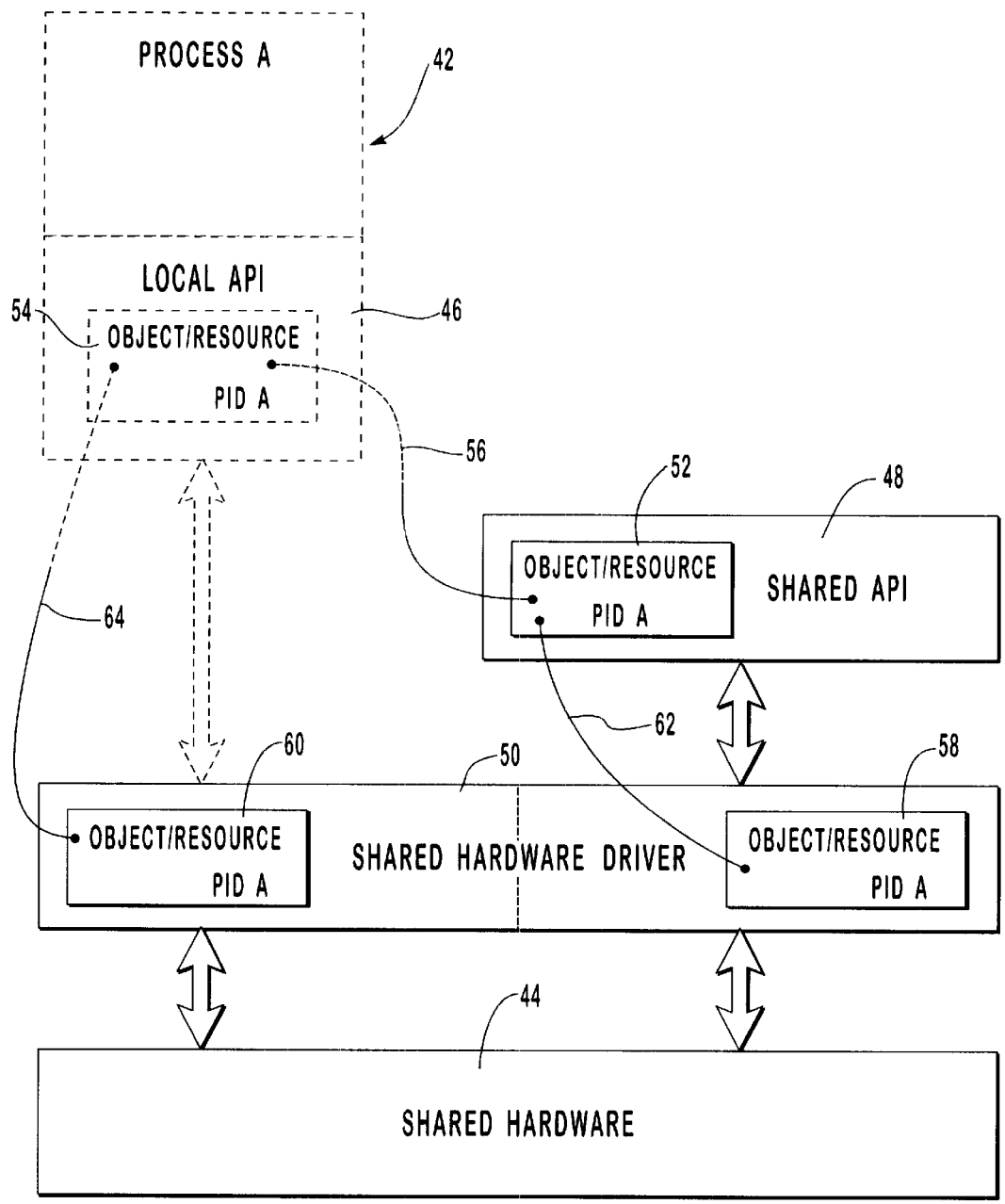
FIG. 5 is a diagram illustrating resources that remain after a process terminates.

Unfortunately, it cannot always be guaranteed that an orderly termination of resource allocating process 42 can be accomplished. For example, if resource allocating process 42 somehow terminates without going through a cleanup procedure, objects and resources in any of the shared layers may remain without being released and returned to a state where they can be allocated for use by other processes. This situation is illustrated in FIG. 5. As indicated in FIG. 5, if resource allocating process 42 terminates without freeing resources and destroying objects in the shared layers, object/resource block 52 will be left with link 56 pointing to an undefined location. If the normal cleanup process were used to remove object/resource block 52, object/resource block 52 would attempt to reference the object at the end of link 56 in order to have that object free its resources and destroy itself Such a situation will result in a system fault since no object currently exists at the end of link 56.

Focusing for a moment on object/resource block 58 and object/resource block 60, it can be seen that the association between object/resource block 52 and object/resource block 58 remains intact since object/resource block 52 has not yet been destroyed and because that portion of hardware driver 50 can still be accessed through shared API 48. However, since object/resource block 54 has previously been destroyed when resource allocating process 42 terminated, the association between object/resource block 54 and object/ resource block 60 has been severed and no API exists that can access that portion of shared hardware driver layer 50. Thus, a method is needed that can destroy object/resource block 52 and release the resources used by that object without attempting to destroy object/resource block 54. Furthermore, a method must be put in place to free all the resources that remain allocated in shared hardware driver layer 50 and return them to a state where they can be reallocated to other processes. A system and method for performing these functions and achieving this goal is presented in FIG. 6.

Figure 6:
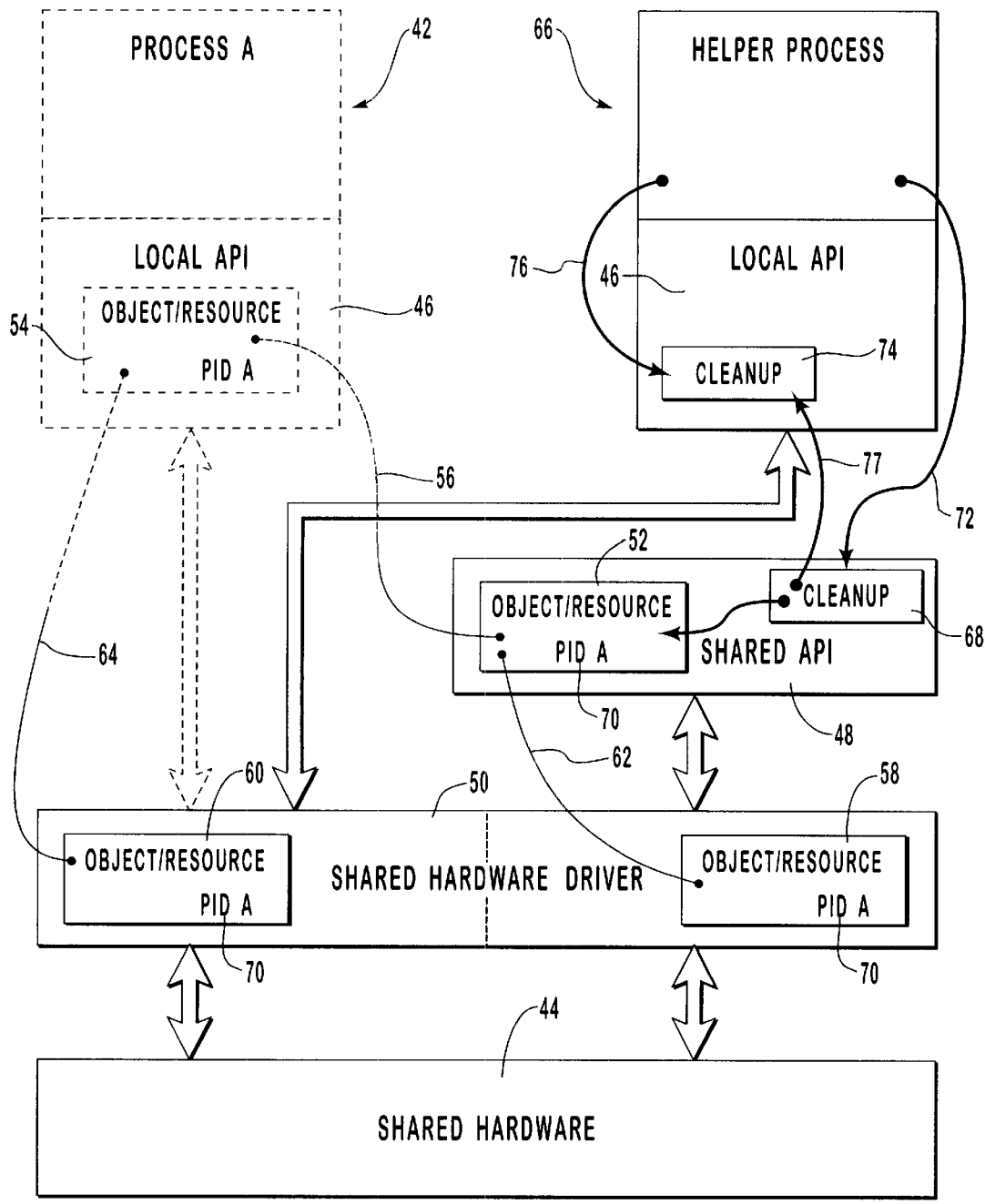
FIG. 6 is a diagram illustrating the system and method of the present invention to release resources that remain allocated in shared layers after a process terminates.

Referring to FIG. 6, a diagram of one embodiment of the present invention is illustrated. In order to free resources that remain allocated after resource allocating process 42 terminates, the present invention starts a helper process, such as helper process 66 of FIG. 6. Helper process 66 is responsible for ensuring that all objects are destroyed and all resources freed after resource allocating process 42 terminates. Helper process 66 can be configured to run only when resource allocating process 42 terminates without freeing resources in shared layers, or helper process 66 can be configured to check each time resource allocating process 42 terminates just to make sure that resources allocated to resource allocating process 42 in the shared layers are released and returned to a state where they can be reallocated to other processes.

A separate helper process may be started for each resource allocating process or a single helper process may be started for all processes. In one embodiment of the present invention, a single helper process is used for all resource allocating processes in the system. In this embodiment, when a resource allocating process is started, a thread of execution is started in helper process 66. The thread of execution remains blocked as long as the resource allocating process has not been terminated. The thread of execution begins to run when the resource allocating process is terminated. The thread of execution then performs several steps to ensure that all resources that have been previously allocated by the resource allocating process are released and made available for other processes.

Helper process 66 frees resources in the following manner. Helper process 66 first calls a special cleanup function in shared API layer 48. This cleanup function is illustrated in FIG. 6 by cleanup function 68. Cleanup function 68 then identifies objects created by resource allocating process 42 and calls the method or function of the object that frees resources used by the object and destroys the object. Cleanup function 68 also ensures that any resources or objects that have been allocated or used in shared hardware driver layer 50 that are associated with objects created by shared API layer 48 are also released and made available for other processes. In FIG. 6, cleanup function 68 would therefore be responsible for destroying object/resource block 52 and associated object/resource block 58.

It is important that during the destruction of object/resource block 52 that no attempt be made to reference object/resource 54 since that object no longer exists. This is ensured by object/resource block 52 refraining accessing any objects that are connected by links, such as link 56, whenever the object is destroyed via cleanup function 68. This can be accomplished by creating separate destructors for the object or by using other logic to distinguish when an object is destroyed by a call from a resource allocating process and when the object is destroyed using cleanup function 68.

In order to identify resources allocated to a resource allocating process that has previously terminated, embodiments within the scope of this invention may comprise means for identifying resources allocated by a resource allocating process. Any mechanism that allows resources allocated by a resource allocating process to be identified may be used. Such a mechanism should allow cleanup function 68 to identify objects and resources of shared API layer 48 that are allocated to a resource allocating process. In one embodiment, all resources allocated by a resource allocating process are assigned an identifier that corresponds to the resource allocating process that created them. Similarly, objects created by a resource allocating process are also assigned the same identifier. Thus, objects in shared API layer 48 and resources in shared hardware driver layer 50 that have been created or allocated by a particular resource allocating process can be identified. In FIG. 6, such means for identifying is illustrated by process ID 70. Thus, if shared API layer 48 and/or shared hardware driver layer 50 keeps a list of object/resource blocks that have been allocated or created by resource allocating processes, and if each object/resource block has the ID of the resource allocating process that created it, then when cleanup function 68 is called, the list of object/resource blocks can be checked for any IDs that correspond to the ID of the terminated resource allocating process. The resource blocks allocated in shared hardware driver layer 50 can also be identified by the process ID.

In order to release resources and destroy objects in the manner previously described, embodiments within the scope of this invention may comprise means for calling at least one function in a means for interfacing with resources. As previously described, a means for interfacing with resources is illustrated in FIG. 6 by shared API layer 48. Furthermore, resources allocated in shared API layer 48 and associated resources in shared hardware driver layer 50 may be released as indicated above by calling cleanup function 68. Thus, helper process 66 requires means for calling at least one function, such as cleanup function 68. In FIG. 6, the means for calling at least one function in a means for interfacing with resources is indicated by arrow 72. Any method that allows a process to call one or more functions in a shared API library, such as shared API 48, can be used. Such mechanisms are known to those of skill in the art and need not be described further herein.

By calling cleanup function 68, helper process 66 is able to free resources in shared API layer 48 and resources in that portion of shared hardware driver layer 50 accessed by shared API 48. However, resources may still exists in shared hardware driver layer 50 that cannot be released through a call to shared API layer 48. An example of such a resource is object/resource block 60. As indicated by line 64, and as previously described, object/resource block 60 was allocated in that portion of shared hardware driver 50 that is accessed through local API layer 46. In order to free resources in that portion of shared hardware driver 50 that is accessed through local API layer 46, one method would be to have shared hardware driver layer 50 provide a direct interface that could be called by a helper process, such as helper process 66, that would cleanup any remaining objects and free resources in that portion of shared hardware driver layer 50. However, such an approach is generally not preferred because such an approach ties a process tightly to a shared hardware driver rather than to an API layer. Another option would be to have shared API layer 48 provide another function that would cleanup all resources allocated in shared hardware driver layer 50 no matter which API layer they were originally associated with. This, however, is not preferred because that would mean that shared API layer 48 would need to interface with both that portion of shared hardware driver layer 50 that was adapted for interfacing with the shared API layer and with that portion of shared hardware driver layer 50 that was adapted for interfacing with a nonshared API layer. In addition, if those two portions of the driver were implemented in two separate drivers, then shared API layer 48 would need to interface with two separate drivers. If, for some reason, a hardware driver did not possess both portions or if both hardware drivers were not loaded, problems may arise. It is, therefore, preferred that shared API layer 48 be adapted to interface and deal strictly with that portion of shared hardware driver layer 50 that is adapted for interfacing with shared API layer 48.

In order to interface with that portion of shared hardware driver layer 50 that is adapted to interface with a nonshared API, it is preferred that the nonshared API include a cleanup function, similar to cleanup function 68. Such a cleanup function is indicated in FIG. 6 by cleanup function 74. Helper process 66 could then load local API 46 into its address space and call cleanup function 74. Cleanup function 74 could then interface with shared hardware driver layer 50 in order to release any resources that remain allocated to resource allocating process 42. Thus, in FIG. 6, cleanup function 74 can be adapted to free object/resource block 60 of shared hardware driver layer 50.

Since helper process 66 will only make use of cleanup function 74, and will not generally access any other of the functionality in local API 46, it may be desirable to provide a slimmed down version of local API layer 46 that can be loaded by helper process 66. This slimmed down version may contain only the functionality needed by helper process 66 to access shared hardware driver layer 50 in order to release any resources that remain allocated to resource allocating process 42.

In order to provide the capability to load local API layer 46, embodiments within the scope of this invention may comprise means for loading a nonshared application program interface library. Such means may comprise any method by which a nonshared API layer is loaded into the address space of a process.

In order to release resources in shared hardware driver layer 50 through a function call in local API layer 46, the embodiments within the scope of this invention comprise means for calling at least one function in a means for interfacing with resources. As previously described, local API 46 is one example of a means for interfacing with resources. One example of a means for calling at least one function in local API 46 is illustrated in FIG. 6 by arrow 76. Such a means may be used in an embodiment where helper process 66 directly calls at least one function in local API 46.

Another example of means for calling at least one function in a means for interfacing with resources is illustrated in FIG. 6 by arrow 77. Arrow 77 represents a call to cleanup function 74 by cleanup function 68. In some embodiments it may be desirable to have helper process 66 make a call to one or more functions of a shared API layer such as shared API layer 48. The function or functions of the shared API layer can then handle any necessary calls to one or more functions of a local, nonshared API, such as local API 46. This approach has several benefits. First, it more completely decouples helper process 66 from the details of cleaning up shared resources. Second, the one or more cleanup functions of the shared API layer, such as cleanup function 68, can try and determine if any resources exist that must be freed by a call to one or more functions in a local API layer. If no such resources exist, then the cleanup function of the local API layer does not need to be called.

Any method of calling at least one function in local API 46 may be used for means for calling at least one function in a means for interfacing with resources. All that is required is that helper process 76 be able to call either directly or indirectly at least one function that achieves the functionality previously described.

In summary, in order to destroy objects and free resources in shared API layer 48 and free resources in shared hardware driver layer 50 that are associated with resources in shared API layer 48, the present invention calls special cleanup function 68. This cleanup function destroys objects and frees resources in shared API layer 48 and also resources in a portion of shared hardware driver layer 50. Through this mechanism, objects and resources such as object/resource block 52 and object/resource block 58 are freed. Furthermore, when object/resource block 52 is destroyed, no attempt is made to reference objects at the end of any links such as link 56. This prevents access to non-existent objects. In order to free resources and destroy objects in that portion of shared hardware driver layer 50 that is accessed through local API layer 46, helper process 66 loads either a complete copy or a slimmed down copy of local API layer 46. Helper process 66 then makes a direct call to cleanup function 74. In the alternative, cleanup function 74 may be called by cleanup function 68. Cleanup function 74 destroys objects and releases resources in the remainder of shared hardware driver layer 50. Through this mechanism, objects and resources such as object/resource block 60 are freed and returned for use by other processes. Thus, any objects and resources left in the shared layers after a resource allocating process has terminated may be released and made available for use by other processes.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A method for destroying orphaned software objects created by a resource allocating process and orphaned by termination of said process in a computer system having a central processing unit, said orphaned software objects including at least one link that currently points to an undefined location but that previously pointed to at least one other software object, and for freeing shared system resources allocated for use by said resource allocating process, the method comprising the steps of:

starting a helper process; and said helper process destroying said orphaned software objects and freeing said system resources by calling at least one function in a library that is shared among all processes running on said computer, said at least one function destroying said orphaned software objects originally created by said resource allocating process through said shared library and freeing system resources by performing at least the steps of:

searching an internal list of objects in order to identify said orphaned software objects that were originally created by said resource allocating process before said resource allocating process terminated but that still exist after said resource allocating process has terminated; and calling at least one function associated with said orphaned software objects that releases system resources used by said orphaned software objects and destroys said orphaned software objects without attempting to destroy said at least other object, so as to avoid referring to a nonexistent object.

2. A method as recited in claim 1 wherein said orphaned objects are identified by comparing an ID code associated with said orphaned software objects to an ID code that was previously associated with said resource allocating process.

3. A method as recited in claim 2 wherein said helper process destroys said orphaned software objects and frees said system resources by further performing the step of releasing resources that remain allocated by said resource allocating process in a shared hardware driver.

4. A method as recited in claim 3 wherein said at least one function releases resources that remain allocated by said resource allocating process in said shared hardware driver through a function call to said hardware driver.

5. A method as recited in claim 4 wherein said resources that remain allocated by said resource allocating process in said shared hardware driver are identified by comparing an ID code associated with said resources in said shared hardware driver to an ID code that was previously associated with said resource allocating process.

6. A method as recited in claim 1 wherein said helper process further performs the step of loading a nonshared application program interface library into its address space.

7. A method as recited in claim 6 wherein said helper process further performs the step of calling at least one function in said nonshared application program interface library that frees resources that were previously allocated by said resource allocating process through said nonshared application program interface library and that remain allocated to said resource allocating process even though said resource allocating process has terminated.

8. A method as recited in claim 7 wherein said helper process directly calls at least one function in said nonshared application program interface library.

9. A method as recited in claim 7 wherein said helper process directly calls said at least one function in said library that is shared among all processes and said at least one function in said library that is shared among all processes calls said at least one function in said nonshared application program interface library.

10. A method for destroying orphaned software objects created by a resource allocating process and orphaned by termination of said process in a computer system, said orphaned software objects including at least one link that currently points to an undefined location, and for freeing shared system resources allocated for use by said resource allocating process, the method comprising the steps of:
    starting a helper process; and
    said helper process destroying said orphaned software objects and freeing said system resources by performing at least the steps of:
      loading a nonshared library into the nonshared address space of said helper process; and
      calling at least one function in said nonshared library, said at least one function releasing resources in a shared library that were allocated by said resource allocating process in said shared library and that remain allocated to said resource allocating process.

11. A method as recited in claim 10 wherein said helper process destroys said orphaned software objects and frees said system resources by further performing the step of releasing resources that remain allocated by said resource allocating process in a shared hardware driver.

12. A method as recited in claim 11 wherein said at least one function in said nonshared library releases resources that remain allocated by said resource allocating process in said shared hardware driver through a function call to said hardware driver.

13. A method as recited in claim 12 wherein said resources that remain allocated by said resource allocating process in said shared hardware driver are identified by comparing an ID code associated with said resources in said shared hardware driver to an ID code that was previously associated with said resource allocating process.

14. A method for destroying orphaned software objects created by a resource allocating process and orphaned by termination of said process in a computer system having a central processing unit, said orphaned software objects including at least one link that currently points to an undefined location but that previously pointed to at least one other software object, and for freeing shared system resources allocated for use by said resource allocating process even though said resource allocating process has terminated and no longer needs said allocated resources, the method comprising the steps of:
    starting a helper process; and
    said helper process destroying said orphaned software objects and freeing said system resources by performing at least the following steps:
      calling at least one function in a library that is shared among all processes running on said computer, said at least one function destroying said orphaned software objects and freeing system resources by performing at least the following steps:
        searching an internal list of objects in order to identify said orphaned software objects that were originally created by said resource allocating process before said resource allocating process terminated but that still exist after said resource allocating process has terminated;
        calling at least one function associated with said orphaned software objects that releases system resources used by said orphaned software objects and destroys said orphaned software objects without attempting to destroy said at least one other software object, so as to avoid referring to a nonexistent object; and
        calling at least one function in a shared hardware driver that frees resources in said shared hardware driver that were allocated by said resource allocating process in said driver and that remain allocated to said resource allocating process;
      loading a nonshared library into the nonshared address space of said helper process; and
      calling at least one function in said nonshared library that releases resources in a shared library that were allocated by said resource allocating process in said shared library and that remain allocated to said resource allocating process.

15. A method as recited in claim 14 wherein said helper process directly calls said at least one function in said nonshared library.

16. A method as recited in claim 14 wherein said at least one function in said nonshared library is called by said at least one function in said library that is shared and is not directly called by said helper process.

17. A computer program product for implementing a method for destroying orphaned software objects created by a resource allocating process and orphaned by termination of said process in a computer system, said orphaned software objects including at least one link that currently points to an undefined location, and for freeing shared system resources allocated for use by said resource allocating process, the computer program product comprising:

a computer-readable medium carrying computer-executable instructions for implementing the method wherein the computer-executable instructions comprise:

program code means for starting a helper process; and program code means for enabling said helper process to destroy said orphaned software objects and free said system resources by calling at least one function in a library that is shared among all processes running on said computer, wherein said at least one function executes:

program code means for searching an internal list of objects in order to identify said orphaned software objects that were originally created by said resource allocating process before said resource allocating process terminated but that still exist after said resource allocating process has terminated; and program code means for calling at least one function associated with said orphaned software objects that releases system resources used by said orphaned software objects and destroys said orphaned software objects without attempting to destroy said at least one other object thereby preventing reference to a nonexistent object.

18. A computer program product as recited in claim 17 wherein the computer-executable instructions further comprise program code means for enabling the helper process to release resources that remain allocated by said resource allocating process in a shared hardware driver.

19. A computer program product for implementing a method for destroying orphaned software objects created by a resource allocating process and orphaned by termination of said process in a computer system, said orphaned software objects including at least one link that currently points to an undefined location, and for freeing shared system resources allocated for use by said resource allocating process, the computer program product comprising:

a computer-readable medium carrying computer-executable instructions for implementing the method wherein the computer-executable instructions comprise:

program code means for starting a helper process; and program code means for enabling the helper process to destroy said orphaned software objects and free said system resources by executing:

program code means for loading a nonshared library into the nonshared address space of said helper process; and program code means for calling at least one function in said nonshared library that releases resources in a shared library that were allocated by said resource allocating process in said shared library and that remain allocated to said resource allocating process.

20. A computer program product as recited in claim 19 wherein the computer-executable instructions further comprise program code means for enabling the helper process to release resources that remain allocated by said resource allocating process in a shared hardware driver.

* * * * *

UNITED STATES PATENT AND TRADEMARK OFFICE
CERTIFICATE OF CORRECTION

PATENT NO.    : 6,496,864 B1                                          Page 1 of 1
DATED         : December 17, 2002
INVENTOR(S)   : Colin McCartney It is certified that error appears in the above-identified patent and that said Letters Patent is hereby corrected as shown below:

Title page,
Item [56], U.S. PATENT DOCUMENTS, insert the following references:
-- 4,747,130   5/1998   Ho..........................379/269
   5,502,840   3/1996   Barton......................395/726
   5,560,003   9/1996   Nilsen et al................395/600
   5,706,515   1/1998   Connelly et al.............395/676 --

Column 3,
Line 52, start a new paragraph with -- In --

Column 6,
Line 34, change "shares" to -- shared --

Column 7,
Line 54, after "special purpose" insert -- computer --

Column 9,
Line 56, delete "be"

Column 10,
Line 19, change "used" to -- use --
Line 57, after "itself" insert -- . --

Column 14,
Line 35, change "illustrated" to -- illustrative --

Column 15,
Line 3, after "least" insert -- one --

Signed and Sealed this

Ninth Day of September, 2003

JAMES E. ROGAN
*Director of the United States Patent and Trademark Office*